US008738423B2

(12) United States Patent
Lyle

(10) Patent No.: US 8,738,423 B2
(45) Date of Patent: *May 27, 2014

(54) LEVERAGING RFID GENERATED CONSUMER BEHAVIOR THROUGH A WEB MAP SERVICE

(71) Applicant: International Business Machines Corporation, Armonk, NY (US)

(72) Inventor: Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/740,215

(22) Filed: Jan. 13, 2013

(65) Prior Publication Data

US 2013/0332238 A1    Dec. 12, 2013

Related U.S. Application Data

(63) Continuation of application No. 13/494,085, filed on Jun. 12, 2012.

(51) Int. Cl.
*G06Q 10/00* (2012.01)
(52) U.S. Cl.
USPC ........ 705/7.34; 705/7.13; 705/7.29; 705/306; 705/308
(58) Field of Classification Search
USPC .............................. 705/7.11–7.42
See application file for complete search history.

(56) References Cited

U.S. PATENT DOCUMENTS

| 5,565,846 | A | 10/1996 | Geiszler et al. ............... 340/572 |
|---|---|---|---|
| 7,293,705 | B2 * | 11/2007 | Linton et al. .................. 235/385 |
| 7,870,042 | B2 * | 1/2011 | Maruca et al. ................. 705/28 |
| 7,990,272 | B2 * | 8/2011 | Wass et al. ................. 340/572.1 |
| 2006/0087436 | A1 | 4/2006 | Reddy et al. ............... 340/572.3 |
| 2007/0106892 | A1 | 5/2007 | Engberg ........................ 713/168 |
| 2007/0268759 | A1 * | 11/2007 | Sabino et al. ................. 365/192 |
| 2009/0051536 | A1 | 2/2009 | Lahiri ........................ 340/572.3 |
| 2011/0068954 | A1 * | 3/2011 | McQuade et al. ............ 340/988 |
| 2011/0186624 | A1 | 8/2011 | Wagner et al. ................ 235/375 |
| 2011/0279245 | A1 * | 11/2011 | Hynes et al. ............... 340/10.42 |

OTHER PUBLICATIONS

"Smart Trash Cans RFID-Based Recycling Technology Makes Philadelphia Greener," Science Daily, Oct. 1, 2006, 3 pages.
"Smart Trash Cans RFID Technology," Gprs Technology, Jun. 5, 2011, 5 pages.
Gomez, "RFID: another attach on our privacy?" TG Daily, Sep. 7, 2010, 8 pages.
Gray, "Spies in your shopping basket?" andrewgray.com, 2004, 6 pages.

(Continued)

*Primary Examiner* — David Rines
(74) *Attorney, Agent, or Firm* — VanLeeuwen & VanLeeuwen; Jeffrey S. LaBaw

(57) ABSTRACT

An approach is provided to analyze consumer behavior data. In the approach, location data corresponding to the consumers is identified. Discarded tagged packages are received from the consumers. The discarded tagged packages include wireless tags that associate the discarded tagged packages product identifiers. At a refuse collection point, each of the wireless tags are read (e.g., using an RFID reader). The reading retrieves the product identifiers associated from the tags on the discarded packages. The product identifiers and the location data are stored in a data store. Consumer consumption maps are generated from the stored product identifiers and location data.

7 Claims, 7 Drawing Sheets

(56) References Cited

OTHER PUBLICATIONS

Murph, "Walmart to add RFID tags to individual items, freak out privacy advocates," Engadget, Jul. 26, 2010, 3 pages.
"Many Eyes," International Business Machines Corporation, 2007, 2 pages.
"A mapping of the waste and recycling sector in Sweden," Swentec, publication date unknown, 74 pages.
"Mapping Plastic Pollution GIS Maps of Plastic Density in the North Pacific Subtropical Gyre (NPSG)," Algalit Marine Research Foundation, 2002-2011, 3 pages.
"Environmental Health WebMaps," Centers for Disease Control and Prevention, Sep. 23, 2011, 2 pages.

* cited by examiner

LEVERAGING RFID GENERATED CONSUMER BEHAVIOR THROUGH A WEB MAP SERVICE

TECHNICAL FIELD

The present disclosure relates to an approach that analyzes consumer consumption based on discarded packaging. More particularly, the present disclosure relates to an approach that retrieves product data from RFID tags included in discarded packaging.

BACKGROUND OF THE INVENTION

Waste management is a large industry with important ecological considerations. Communities and businesses around the world are working to become more socially responsible, more eco-friendly, and "greener" places to live. These efforts are largely encouraged by a populace that desires a safer and cleaner living environment. Consequently, technological solutions in waste management are being developed to provide more ecologically focused services. Radio-frequency identification (RFID) is the use of a wireless non-contact system that uses radio-frequency electromagnetic fields to transfer data from a tag attached to an object. RFID is used in industry for automatic identification and tracking of objects. Some RFID tags require no battery and are powered by the electromagnetic fields used to read them. Others RFID tags use a local power source and emit radio waves (electromagnetic radiation at radio frequencies). The tag contains electronically stored information which can be read from a distance rather than needing a line of sight, such as in the case of bar codes.

SUMMARY

An approach is provided to analyze consumer behavior data. In the approach, location data corresponding to the consumers is identified. Discarded tagged packages are received from the consumers. The discarded tagged packages include wireless tags that associate the discarded tagged packages product identifiers. At a refuse collection point, each of the wireless tags are read (e.g., using an RFID reader). The reading retrieves the product identifiers associated from the tags on the discarded packages. The product identifiers and the location data are stored in a data store. Consumer consumption maps are generated from the stored product identifiers and location data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
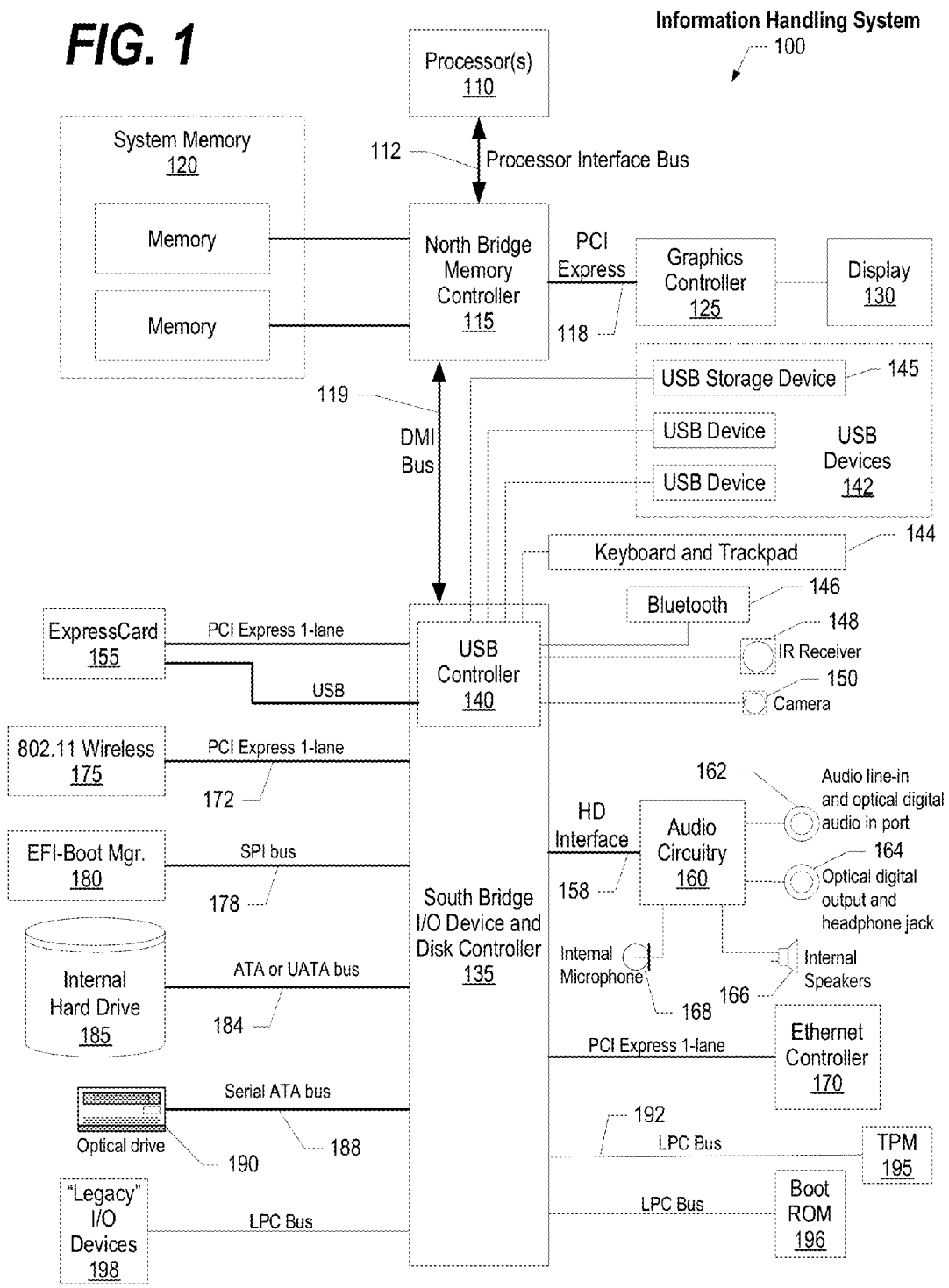
FIG. 1 is a block diagram of a data processing system in which the methods described herein can be implemented.
Figure 2:
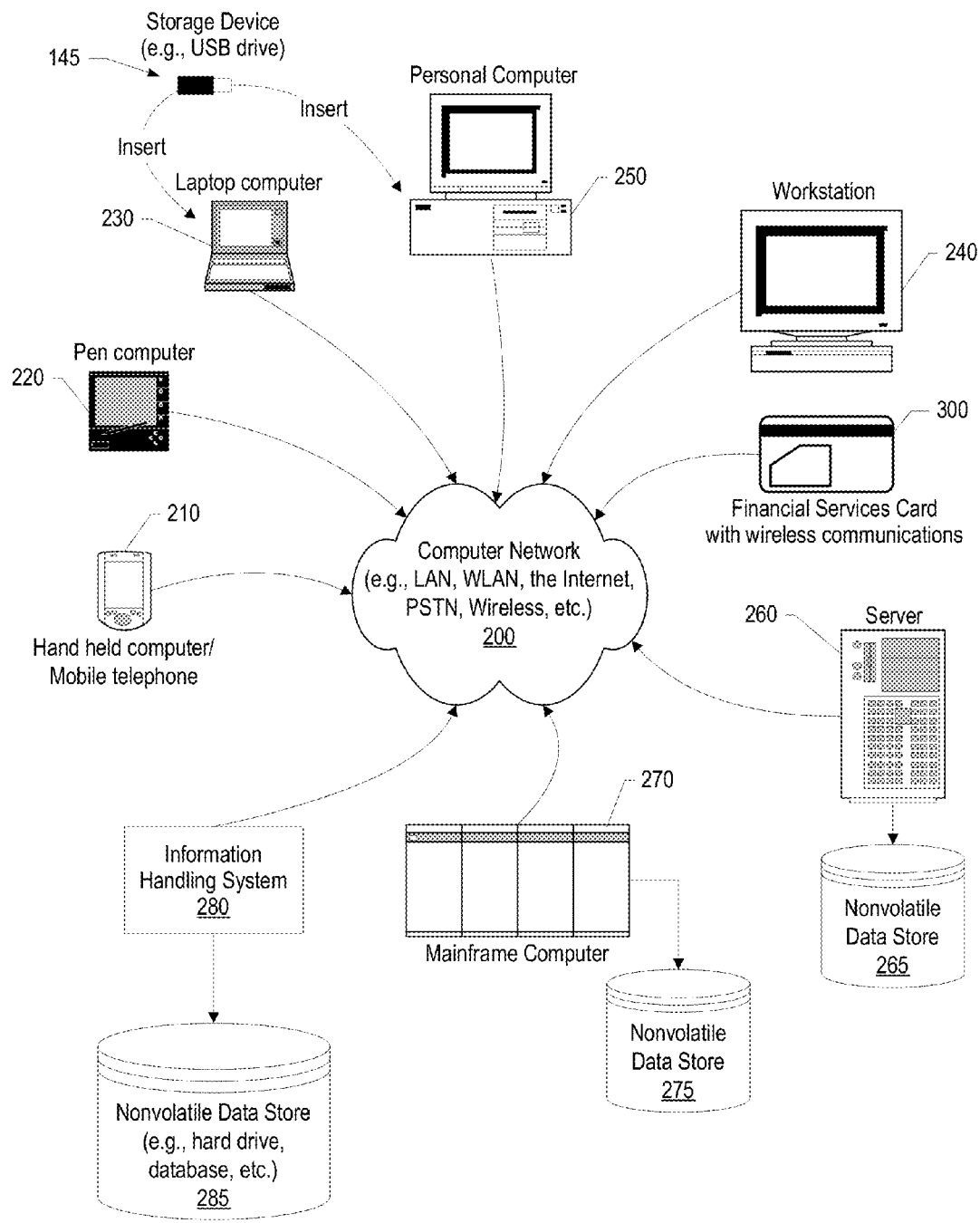
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-7 depict an approach that can be executed on an information handling system and computer network as shown in FIGS. 1-2. In this approach, consumers purchase products packaged in tagged packaging. The tags used on the packaging are wireless tags, such as radio-frequency identification (RFID) tags. The data transmitted by the wireless tags includes product identification information (product identifiers) such as Universal Product Codes (UPCs) or other codes/identifiers that identify the product. The user disposes of the packaging, either as garbage or as a recycled item, the tags are read at the refuse collection point, such as a mobile refuse collection vehicle (e.g., garbage truck, recycling truck, etc.) or at a fixed-point refuse collection point such as a recycling center, garbage dump, dumpster, etc. Wireless tag readers, such as RFID tag readers, are installed at the refuse collection point and capture the product identifiers from the discarded packaging as well as the consumer location data. In one embodiment, the consumer location data and other data that may be used to uniquely identify a particular consumer are anonymized to protect the consumer's identity and privacy. For example, rather than transmitting a particular street address where the packaging was collected, the process may anonymize the location to be a particular neighborhood or other geographic area. The collected data is then aggregated with other consumers' data in order to generate area consumer consumption maps. These area consumer consumption maps may be used by marketing organizations to market products to particular geographic areas (e.g., where the data shows that a competitor's product is widely used in the geographic area, etc.), healthcare and insurance providers to provide targeted programs, such as wellness programs and screenings (e.g., where the data shows a high level of consumption of sugary or high fat foods that may lead to a higher incidence of diseases such as diabetes or heart disease, etc.).

Figure 3:
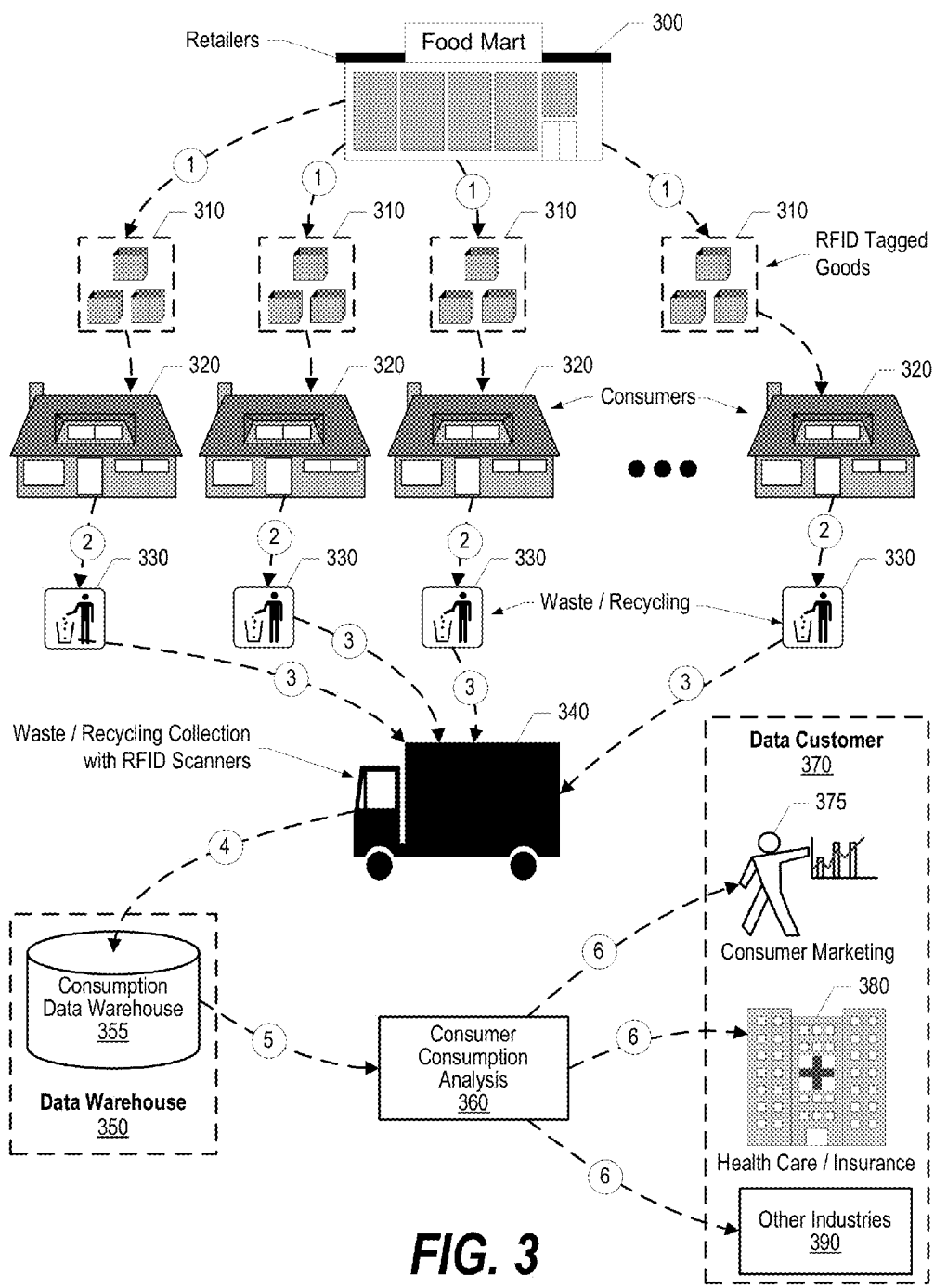
FIG. 3 is a component diagram showing the various components that interact to analyze consumer behavior via tags, such as RFID, included on packaging and other materials that are discarded.

FIG. 3 is a component diagram showing the various components that interact to analyze consumer behavior via tags, such as RFID, included on packaging and other materials that are discarded. Product packaging has wireless tags, such as Radio-Frequency Identification (RFID) tags embedded or otherwise included in the packaging (tagged packages 310). Retailers 300 receive tagged packages from manufacturers, distributors, and the like. At the first step (1), retailer 300 sells tagged packages 310 to consumers 320. The wireless tags (RFID tags) associates the packaging with a particular product (product identifier). One example of a product identifier is a Universal Product Code (UPC) that are uniquely assigned to each product. Other examples of product identifiers include Global Trade Item Numbers (GTINs) or any code that identifies the product sold by the retailer and consumed by the consumer.

Consumers 320 thus consume products that were packaged in RFID-tagged packages. At the second step (2), after the product has been consumed or removed from the packaging, the consumer discards the tagged packages in receptacle 330. At the third step (3), the discarded tagged packages are collected from receptacles 330 at refuse collection point 340. In one embodiment, refuse collection point 340 is a mobile refuse collection vehicle, such as a garbage truck that collects refuse that is garbage or a recycling truck that collects refuse that is made of recyclable material, such as many plastics, aluminum, metals, cardboard, paper-based packaging, and other recyclable materials. In another embodiment, refuse collection point 340 is a fixed refuse collection point, such as a landfill, garbage dump, recycling center, dumpster or other location to which consumers travel in order to discard tagged packages. Refuse collection point 340 includes tag readers, such as RFID tag readers, that read the product identifier data from the RFID tags included in the tagged discarded packages. When refuse is collected, the consumer's location is retrieved along with the product identifier data. In the case of a mobile refuse collection vehicle, the consumer's location data can be identified by using a GPS system that identifies the location data as the vehicle is traveling to customers (consumers) and picking up discarded tagged packages (e.g., in garbage cans, recycling cans, etc.). In the case of a fixed point refuse collection point, the consumer provides his or her location data to an operator of the fixed point refuse collection point (e.g., displaying a driver's license, etc.) or can provide location data using another means such as entering the consumer's location data at a kiosk or swiping the consumer's identification card (e.g., the consumer's driver's license, etc.).

In one embodiment, used to protect consumers' privacy, the user's location data is anonymized so that the particular consumer can not be identified (e.g., providing a neighborhood name, a street name, etc., rather than providing the consumer's actual physical address).

At the fourth step (4), the refuse collection point, such as mobile refuse collection vehicle 340, transmits the collected product identifiers and location data to data warehouse 350 where the data is stored in consumption data store 355 (e.g., data from a large geographic region, such as a city, state, or country, can be stored in consumption data store 355). At the fifth step (5), consumer consumption analysis processes 360 are performed using the product identifier and location data stored in consumption data store 355. This analysis results in consumer consumption maps that, based on the input (query) requirements, can be tailored for various data consumers 370. For example, data consumers can include marketing organizations 375 that wish to better understand product penetration in various geographic areas in order to tailor advertisements and other promotions to areas where the organization's products lag behind competitors' products. In another example, data consumers can include health care and insurance providers in order to better understand the consumption characteristics of a particular area in order to tailor wellness and other health-based initiatives at an area based on the current consumption patterns or on a history of consumption patterns indicated by the consumer consumption maps. In addition, many other industries 390, such as retailers and the like may also benefit from the generated consumer consumption maps. At the sixth step (6), the area consumer consumption map is provided to data customer 370.

Figure 4:
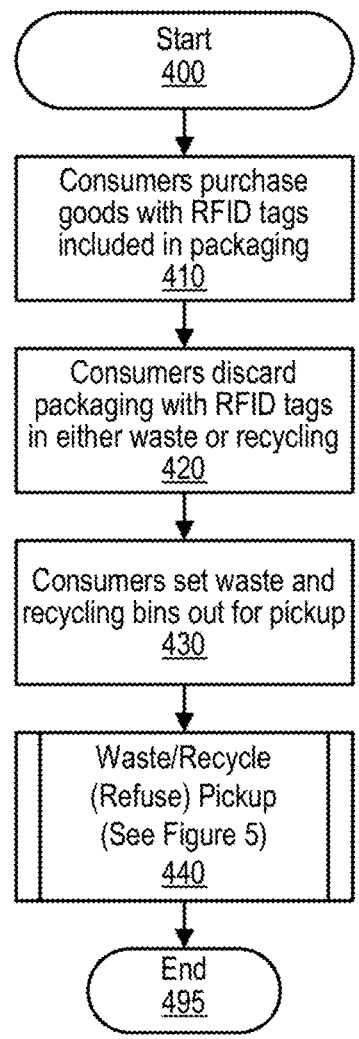
FIG. 4 is a flowchart showing steps performed by consumers to facilitate the analysis of the consumers' behavior.

FIG. 4 is a flowchart showing steps performed by consumers to facilitate the analysis of the consumers' behavior. Processing performed by consumers commences at 400 whereupon, at step 410, the consumers purchase products that have wireless tags (e.g., RFID tags) included in the products' packaging. As previously described, the wireless tags include product identification information (product identifiers) that identify the product that was associated with the discarded product packaging. At step 420, after consuming or otherwise removing the product from the product packaging, the consumer discards the tagged packages that include the wireless tags (RFID tags). At step 430, the consumer disposes of the discarded tagged packages at a refuse collection point. In one embodiment, the refuse collection point is a mobile refuse collection vehicle, such as a garbage truck or recycling truck, that collects the discarded tagged packages from a location proximate to the consumer's residence (e.g., curb-side garbage/recycle collection, etc.). In another embodiment, the consumer delivers the discarded tagged packages to a fixed-point refuse collection point, such as a community recycling center, community garbage dump or landfill, etc.

In the case of the mobile refuse collection vehicle, location data is identified at the vehicle at the time of the collection (e.g., using a global positioning system (GPS) receiver, having the driver enter the location data, etc.). However, in the case of the fixed-point collection point, the consumer provides the consumer's location data (e.g., at a kiosk, by providing the user's identification card, such as a driver's license, etc.). At predefined process 440, a refuse collection process is performed to acquire the location data as well as the product identifiers encoded on the wireless tags (e.g., RFID tags) embedded or attached to the discarded tagged packages. In addition, predefined process 440 transmits the collected data to a data warehouse where the data is combined with other consumers' consumption data. The data stored at the data warehouse can then be analyzed and area consumer consumption maps can be generated.

Figure 5:
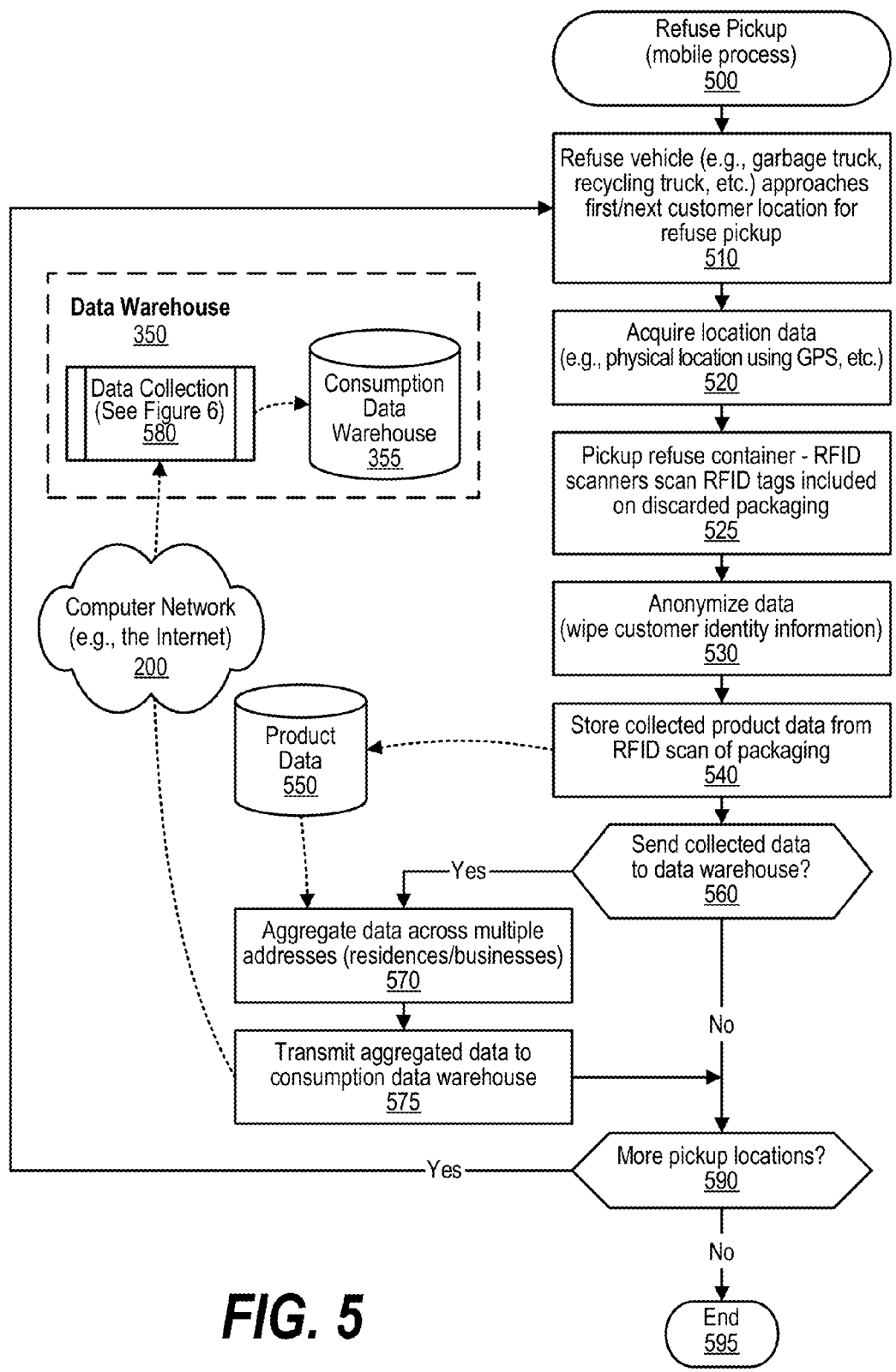
FIG. 5 is a flowchart showing steps performed in conjunction with waste/recycling pickup to gather consumer behavior data.

FIG. 5 is a flowchart showing steps performed in conjunction with waste/recycling pickup to gather consumer behavior data. Refuse collection processing commences at 500 whereupon, at step 510, in the case of a mobile refuse collection vehicle, the refuse vehicle (e.g., a garbage truck, recycling truck, etc.) approaches the first consumer's location (e.g., home address, business address, etc.) for curbside refuse pickup. At step 520, the mobile refuse collection vehicle acquires location data pertaining to the consumer (e.g., using a GPS receiver that receives the geographic location data and translates the geographic location data (e.g., coordinates) to location data such as a street address. If a GPS system is unavailable or not used, the driver of the mobile refuse collection vehicle can enter the street address (e.g., at a keypad or other input device, etc.).

At step 525, the discarded tagged packages of the consumer are scanned by a wireless tag readers (e.g., RFID scanner, etc.) with the scanning reading each of the wireless tags and retrieving the product identifiers associated with each of the discarded tagged packages. In the case of a mobile refuse collection vehicle, the wireless tag readers can be installed proximate to the refuse opening of the vehicle so that the tags are read when the discarded tagged packages pass between the readers on their way through the refuse opening into a container included in the vehicle. Likewise, in the case of a fixed-point refuse collection point, the wireless tag readers can be installed proximate to the entrance or opening to the area or container where discarded items are placed so that the discarded tagged packages pass between the readers on their way through the entranceway or opening to the area or container where the discarded tagged packages are placed.

In one embodiment, the consumers identity and privacy are maintained by anonymizing the data received, such as the location data, so that the individual consumer cannot be later identified based on a particular address, etc. The anonymizing takes place at step 530 where the process wipes or otherwise removes consumer identity information, such as by removing the address number, translating the street address to a neighborhood or other area designation, or the like. At step 540, the collected product identifiers from the discarded tagged packages and the identified location data are stored in product data store 550 (e.g., a data store maintained on an information handling system located at the mobile refuse collection vehicle or a data store maintained at an information handling system located at the fixed refuse collection point, etc.).

A determination is made as to whether it is time to send data collected and stored in data store 550 to the data warehouse (decision 560). For example, in a mobile environment, the truck can transmit the collected data to the data warehouse after a particular number of pickups have been performed, on a timed basis (e.g., every thirty minutes, etc.), and at the end of the shift or run when the truck is transporting the collected discarded tagged packages to a recycling center or landfill. If it is time to send the collected data to the data warehouse, then decision 560 branches to the "yes" branch whereupon, at step 570, if the data has not yet been anonymized, then the collected data is aggregated across multiple addresses to protect the identity and the privacy of individual consumers. At step 575, the anonymized data is transmitted from the refuse collection point (mobile or fixed) to data warehouse 350. As shown, data warehouse 350 performs data collection predefined process 580 that receives the data from the collection points and stores it in consumption data store 355 (see FIG. 6 and corresponding text for further processing details regarding the data warehouse's data collection process). Returning to decision 560, if it is not time to send the collected data to the data warehouse, then decision 560 branches to the "no" branch bypassing step 570 and 575.

A determination is made as to whether there are more consumers from which discarded tagged packages are being received (decision 590). If there are more consumers from which the collection point (e.g., the garbage or recycling truck, etc.) is collecting discarded tagged packages, then decision 590 branches to the "yes" branch which loops back to approach the next consumer (e.g., on a vehicle's route, etc.) and performs the refuse pickup steps described above. This looping continues until there are no more consumers from whom discarded tagged packages are being received, at which point decision 590 branches to the "no" branch and refuse pickup processing ends at 595.

Figure 6:
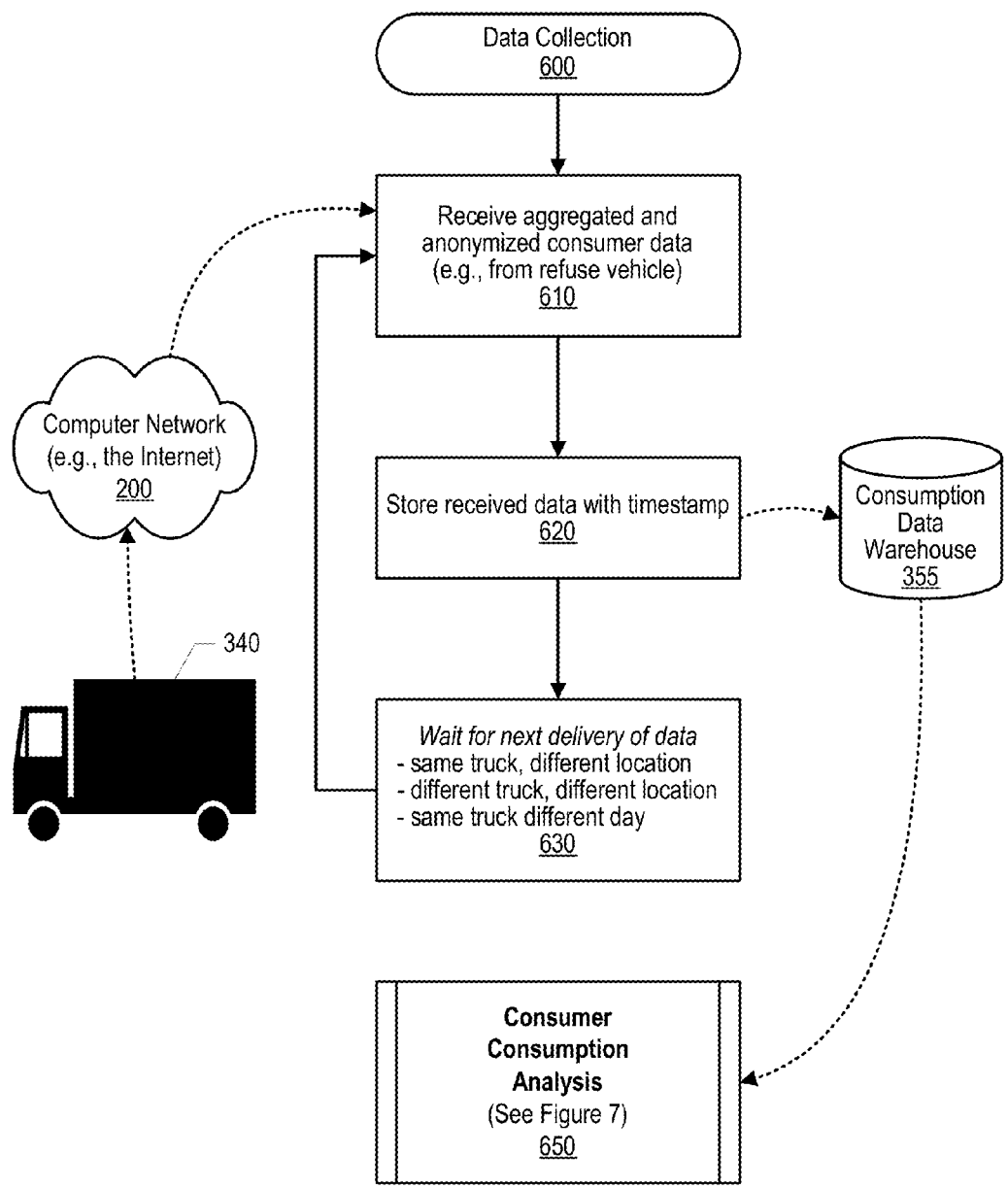
FIG. 6 is a flowchart showing steps performed to gather data from multiple data collection points.

FIG. 6 is a flowchart showing steps performed to gather data from multiple data collection points, such as by a data warehouse. Data warehouse processing commences at 600 whereupon, at step 610, the data warehouse receives consumer data (location data and product identifiers) from a refuse collection point, such as a mobile refuse collection point (e.g., garbage or recycling truck, etc.) or from a fixed refuse collection point. In one embodiment the received data is anonymized and/or aggregated to protect the identity and privacy of individual consumers. Additionally, if the data is not anonymized and/or aggregated at the refuse collection point, the data can alternately be anonymized and/or aggregated at the data warehouse.

At step 620, the received data (location data pertaining to product identifiers of discarded tagged packaging) is stored in consumption data store 355 along with a timestamp indicating when the data was collected (either at the refuse collection point or at the data warehouse). At step 630, the process waits for a next delivery of data (e.g., from another mobile refuse collection point (garbage/recycling truck), from another fixed refuse collection point, from the same mobile refuse collection point but at a different location, from the same refuse collection point but on a different time or day, etc.). When the next delivery of data is received, processing loops back to step 610 to receive the next set of data (location and product identifiers) and store the data in consumption data store 355.

Figure 7:
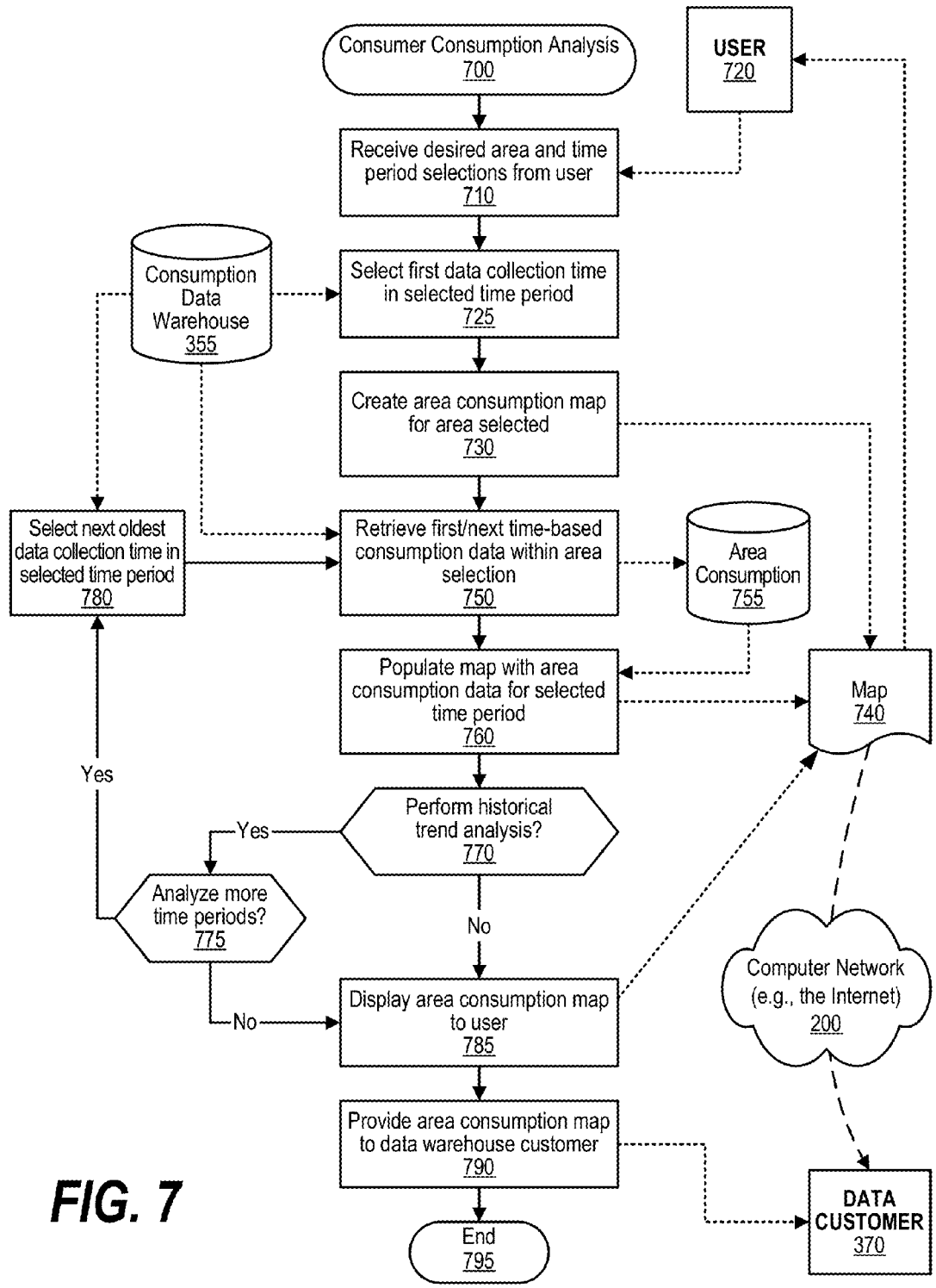
FIG. 7 is a flowchart showing steps performed to analyze the gathered consumer data.

At predefined process 650, a consumer consumption analysis process is performed in order to generate area consumer consumption maps using the product identifiers and location data stored in consumption data store 355. FIG. 7 provides details regarding the consumer consumption analysis process.

FIG. 7 is a flowchart showing steps performed to analyze the gathered consumer data. The consumer consumption analysis process commences at 700 whereupon, at step 710, the desired area, time period, and product identifier selections are received from user 720. For example, the user could select particular neighborhoods, areas of a town, city, state, etc. as well as a time period (e.g., for historical trend analysis reports, etc.). In addition, the user may focus on particular product identifiers of interest (e.g., a competitor's product identifier and the user's product identifier to perform a product penetration analysis for the desired area, etc.).

At step 725, the analysis process selects the product identifiers in the collected data that were collected from the selected area at a first time are retrieved from consumption data store 355. In one embodiment, the most current data from the time period is selected as the first time with subsequent time selections moving back in time.

At step 730, an area consumption map (unpopulated) is created (map 740) showing the geographic area requested by the user. At step 750, the first time-based consumer consumption data is selected within the desired area and with the desired product identifiers from consumption data store 755. This data is stored in area consumption data store 755.

At step 760, the area consumer consumption map is populated showing a map of the desired area overlaid with product identifier information during the first selected time by using the data stored in area consumption data store 755. For example, when comparing two products (two different product identifiers), one product's penetration can be shown in shades of blue with darker blue shadings depicting high product penetration and lighter shades of blue depicting lower product penetration of one product, with the other product shown in shades of red with darker red shadings depicting high product penetration and lighter shades of red depicting lower product penetration of the other product. In addition, the product identifiers can be aggregated if product comparison is not desired. For example, the user can enter a list of product identifiers corresponding to unhealthy products (e.g., high fat, high sugar foods, etc.) and the generated consumer consumption map can use a shading pattern (e.g., shades of gray) where dark shades of gray depict areas of high consumption of the unhealthy products while lighter shades of gray depict areas of lower consumption of the unhealthy product.

A determination is made as to whether the user has requested a historical trend analysis (decision 770). For example, the user may be looking for the trend of unhealthy food consumption in a particular area over a particular time period (e.g., one year, five years, etc.) in order to ascertain whether the consumers in the area are trending to make more healthy buying decisions, less healthy buying decision, or the same buying decisions. Likewise, for marketing purposes, the historical trend analysis can reveal whether a given product is increasing in market share in a given area, experiencing a reduction in market share, or is relatively flat in terms of changing market share. If the user has requested to perform a historical trend analysis, then decision 770 branches to the "yes" branch whereupon a determination is made as to whether there are additional time periods to analyze in order to satisfy the user's request (decision 770). If there are additional time periods to analyze, then decision 770 branches to the "yes" branch whereupon, at step 780, the next oldest data collection time is selected in the selected location with the selected product identifiers and processing loops back to process the newly selected data to populate the consumer consumption map with the newly selected data. The newly selected data can be distinguished on the resulting consumer consumption map by use of different colors, shadings, and the like. In addition, multiple consumer consumption maps can be generated in order to visually analyze the historical trends depicted across a number of maps. This looping and further population of the consumer consumption map continues until there is no more data in the time period selected by the user for the given area that needs to be analyzed, at which point decision 775 branches to the "no" branch for further processing.

If historical trend analysis is not being performed (decision 770 branching to the "no" branch) or if there are no more data to analyze in the historical trend analysis (decision 775 branching to the "no" branch), then at step 785, the area consumer consumption map 740 (or maps) are displayed to user 720. If the user was creating the area consumer consumption map for a customer (e.g., a marketing organization, healthcare/insurance provider, etc.), then, at step 790, the area consumer consumption map is provided to data customer 370 (e.g., by sending map 740 to data customer 370 via computer network 200, such as the Internet, etc.). Area consumer consumption analysis processing thereafter ends at 795.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of analyzing consumer data, the method comprising:
   identifying location data corresponding to a plurality of consumers, each of the consumers located at one of a plurality of geographic locations;
   receiving a plurality of discarded tagged packages from each of the plurality of consumers, wherein each of the discarded tagged packages includes a wireless tag that associates each of the discarded tagged packages with a product identifier;
   reading, at a refuse collection point, each of the wireless tags, wherein the reading retrieves the product identifiers associated with each of the discarded tagged packages;
   storing the retrieved product identifiers and the location data in a data store; and generating, by one more processors, one or more area consumer consumption maps from the stored product identifiers and the stored location data, wherein the generating further comprises:
  receiving a geographic area request; and
  selecting, from the data store, the stored product identifiers with geographic location data corresponding to the requested geographic area, wherein one of the area consumer consumption maps corresponds to the selected stored product identifiers.

2. The method of claim 1 wherein the location data is aggregated location data that inhibits identification of individual consumers and wherein the wireless tags are Radio-frequency Identification (RFID) tags.

3. The method of claim 2 wherein the identification of location data corresponding to the plurality of consumers further comprises:
  acquiring consumer data corresponding to each of the plurality of consumers during a refuse pick-up operation performed by a mobile refuse collection vehicle;
  retrieving the geographic location corresponding to the acquired consumer data; and
  anonymizing the acquired consumer data.

4. The method of claim 3 wherein reception of the product identifiers is performed by one or more RFID tag readers installed in the mobile refuse collection vehicle, wherein the identification of the location data is performed by a GPS receiver, and wherein the method further comprises:
  wirelessly transmitting the retrieved product identifiers and the identified location data from the mobile refuse collection vehicle to a data warehouse that maintains the data store.

5. The method of claim 2 wherein the identification of a location data corresponding to the plurality of consumers further comprises:
  receiving consumer data corresponding to each of the plurality of consumers from the consumers during drop off of the discarded tagged packages at a fixed refuse collection point, wherein the reception of the product identifiers is performed by one or more RFID tag readers installed at the fixed refuse collection point.

6. The method of claim 1 further comprising:
  periodically repeating the identifying, receiving, reading, and storing steps over a period of time, wherein the storing includes a timestamp corresponding to a time at which the retrieved product identifiers and the location data were stored; and
  collecting historical consumer consumption data from the periodically repeated steps.

7. The method of claim 6 further comprising:
  receiving a selected time period from a user; and
  wherein the selecting further comprises selecting, from the data store, the stored product identifiers with timestamps corresponding to the selected time period.

\* \* \* \* \*